(12) United States Patent
Molnar et al.

(10) Patent No.: US 11,428,919 B2
(45) Date of Patent: Aug. 30, 2022

(54) OBJECTIVE CHANGING AND FOCUSING APPARATUS FOR MICROSCOPES, AND MICROSCOPE HAVING SUCH OBJECTIVE CHANGING AND FOCUSING APPARATUS

(71) Applicant: 3DHISTECH KFT., Budapest (HU)

(72) Inventors: Bela Molnar, Budapest (HU); Viktor Sebestyen Varga, Budapest (HU); Janos Tibor Devenyi, Budapest (HU)

(73) Assignee: 3DHISTECH KFT.

( * ) Notice: Subject to any disclaimer, the term of this patent is extended or adjusted under 35 U.S.C. 154(b) by 343 days.

(21) Appl. No.: 16/764,075

(22) PCT Filed: Nov. 9, 2018

(86) PCT No.: PCT/HU2018/050047
§ 371 (c)(1),
(2) Date: May 14, 2020

(87) PCT Pub. No.: WO2019/102238
PCT Pub. Date: May 31, 2019

(65) Prior Publication Data
US 2020/0371334 A1    Nov. 26, 2020

(30) Foreign Application Priority Data
Nov. 22, 2017 (HU) .................................. P1700483

(51) Int. Cl.
*G02B 21/24* (2006.01)
*G02B 7/02* (2021.01)
(Continued)

(52) U.S. Cl.
CPC ........... *G02B 21/241* (2013.01); *G02B 7/021* (2013.01); *G02B 7/14* (2013.01); *G02B 21/02* (2013.01);
(Continued)

(58) Field of Classification Search
CPC .. G02B 21/0016; G02B 21/002; G02B 21/02; G02B 21/241; G02B 21/248;
(Continued)

(56) References Cited

U.S. PATENT DOCUMENTS

6,268,958 B1  7/2001 Furuhashi
6,636,352 B2 10/2003 Engelhardt
(Continued)

*Primary Examiner* — Joseph P Martinez
*Assistant Examiner* — Vipin Patel
(74) *Attorney, Agent, or Firm* — Olson & Cepuritis, Ltd.

(57) ABSTRACT

The object of the invention relates to an objective changing and focussing apparatus (10) for microscopes (100) containing a plurality of objectives (12), and having an optical axis Z, the essence of which is that it contains—a first rail system (16a) having a first guide rail (17a) fixed to the microscope (100) and a first moving member (18a) guided by the first guide rail (17a), wherein the first rail system (16a) is arranged along an axis X perpendicular to the optical axis Z, —a first drive unit (20a) in drive connection with the first rail system (16a), —a plurality of objective interface elements (24), adapted for being connected to the objectives (12), arranged next to one another along the X axis and fixed to the first moving member (18a) movably along the Z axis, —a second rail system (16b) having a second guide rail (17b) fixed to the microscope (100) and a second moving member (18b) guided by the second guide rail (17b), wherein the second rail system (16b) is arranged parallel to the optical axis Z, and defines a starting position along the X axis, and—a second drive unit (20b) having a second drive connection with the second rail system (16b), and the second moving member (18b) is provided with a lifting element (26) providing a releasable connection with an objective interface (24) located in the starting position. The object of the invention also relates to a microscope containing such an objective changing and focusing apparatus (10).

10 Claims, 8 Drawing Sheets (51) Int. Cl.
    *G02B 7/14*      (2021.01)
    *G02B 21/02*     (2006.01)
    *G02B 27/64*     (2006.01)
    *G02B 21/00*     (2006.01)

(52) U.S. Cl.
    CPC .......... *G02B 27/646* (2013.01); *G02B 21/002* (2013.01)

(58) Field of Classification Search
    CPC ...... G02B 21/26; G02B 27/646; G02B 7/021; G02B 7/14; Y02A 40/25
    See application file for complete search history.

(56) References Cited

U.S. PATENT DOCUMENTS

2006/0164721 A1      7/2006  Uhl
2006/0164935 A1*     7/2006  Nozaki ................ B23K 26/064
                                                      369/44.11

\* cited by examiner

OBJECTIVE CHANGING AND FOCUSING APPARATUS FOR MICROSCOPES, AND MICROSCOPE HAVING SUCH OBJECTIVE CHANGING AND FOCUSING APPARATUS

CROSS-REFERENCE TO RELATED APPLICATIONS

This application is a U.S. National Stage of PCT/HU2018/050047, filed Nov. 9, 2018, which claims priority to Hungarian Application No. P1700483, filed Nov. 22, 2017, each of which is incorporated herein by reference.

The object of the invention relates to an objective changing and focussing apparatus for microscopes containing a plurality of objectives.

The object of the invention also relates to a microscope having a plurality of objectives that contains such objective changing and focussing apparatus.

Microscopes containing several different objectives have been used for many years in the interest of being able to select the magnification and resolution to correspond with the examination in question and the object being observed. In the case of these microscopes the changing of the objectives takes place either manually or by using a so-called microscope objective revolver, which is very frequently used in the case of light microscopes. The essence of the latter is that the objectives are arranged sequentially in the sockets of a circular revolver that may be rotated around an axis passing through the centre point of the circle. By rotating the objective revolver the objective that is to be selected for use may be set into the light path. Rotation of the revolver usually takes place manually, but motor-driven systems are also in existence (see, for example, patent document JP 2002-107173). The advantage of the solution is that it is relatively compact as a result of its design; therefore several objectives can be arranged in a small space. However, its disadvantage is that usually the focus of the objective set into the light path can only be changed by moving the entire revolver, which may represent a problem in the cases of examinations demanding fast changes of focus.

U.S. Pat. No. 6,359,731 B1 discloses another way of changing objectives. The presented optical element-switching device contains two objectives arranged next to one another on a straight line that may be pushed along a rail, which may be pushed into the desired position (into the light path) manually using a lever. The essence of the solution is that in the course of switching between objectives the objective to be replaced is not only displaced horizontally, but is also raised. The specification does not contain any teaching relating to the method of focussing, however, on inspecting the figures it presumably takes place manually. The disclosed devices was developed especially for immersion microscopes, however, in the case of examinations demanding a fast change of focus, such as in the cases of scanning microscopes, this solution cannot be used either.

In the case of high-speed transmitted light scanning microscopes, first of all a preview image is created using a low-resolution but wide-angle objective, then the sample is scanned using a higher resolution objective. In the course of scanning it is essential for the sample moving under the objective to not significantly move away from the plane of focus of the objective, otherwise the image of the sample will be blurred and get out-of-focus. In order to prevent this the focus of the objective needs to be suitably changed during the scanning process, which makes it possible to follow the changes in the surface of the moved sample. However, vibrations occur when the objective is focused (moved), which lead to the drastic deterioration of image quality. These vibrations are capable of significantly damaging the performance of the microscope, and its negative effect increases as magnification increases.

The aim of the invention is the provision of an objective changing and focussing apparatus that is free of the disadvantages of the solutions according to the state of the art, in other words, which is capable of simultaneously switching objectives and quickly and precisely changing the focus of the set objective.

The aim of the invention is also the provision of an objective changing and focussing apparatus that effectively dampens the vibrations occurring during the focussing of the objective, thereby improving the imaging quality.

The aim of the invention is also the provision of a microscope that has several objectives and that contains the objective changing and focussing apparatus according to the invention that is free of the disadvantages of the solutions according to the state of the art.

The invention is based on the recognition that if the objectives are arranged one after the other so that they may be pushed along the axis X substantially perpendicular to the optical axis Z of the microscope so that they are fixed to a rail system that may be moved in parallel to the optical axis Z then the changing of the objectives and their focussing may be effectively realised.

The invention is also based on the recognition that by ensuring that the objectives can move independently of one another along the Z axis and by establishing the objective interface elements as objective-holding sockets suitable for damping vibrations, the negative effect of vibrations occurring during the focussing of the objectives can be effectively reduced, and the imaging quality can be significantly improved.

The invention is also based on the recognition that by using a linear piezoelectric motor the movement of the objective along the Z axis and its focussing can be performed in a more precise and cost-effective way as compared to the solutions according to the state of the art.

The task was solved in terms of the invention using the objective changing and focussing apparatus according to claim 1.

The task was also solved using the microscope according to claim 10.

The individual preferred embodiments of the inventions are specified in the subclaims.

Further details of the invention will be explained by way of exemplary embodiments with reference to the figures, wherein:

FIG. 4c depicts a schematic side view of the embodiment of the objective changing and focussing apparatus according to the invention presented in FIG. 4a.

Figure 1A:
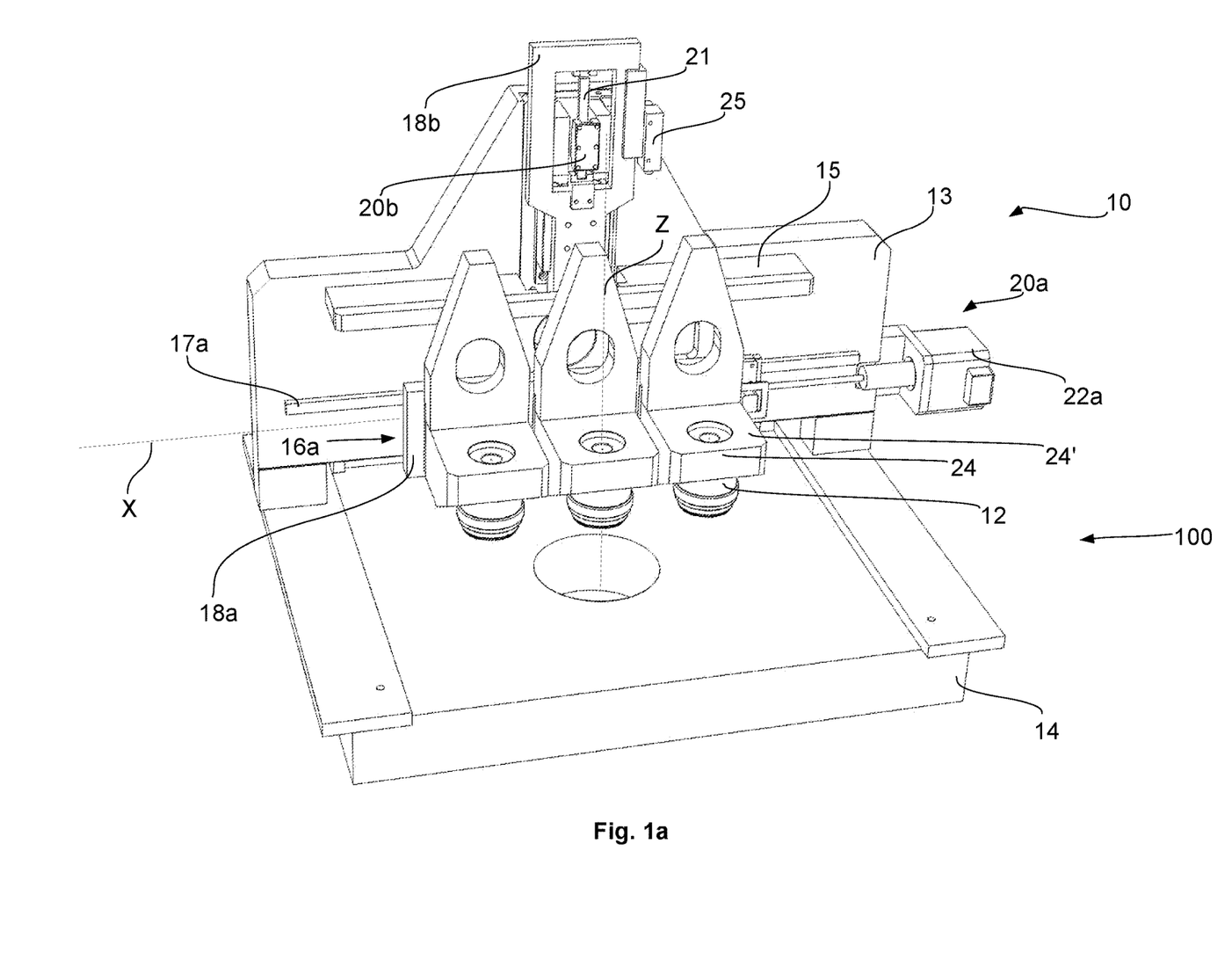
FIG. 1a depicts a schematic perspective view of a preferred embodiment of the objective changing and focussing apparatus according to the invention in its state fitted to a microscope.

FIG. 1a depicts a schematic perspective view of a preferred embodiment of the objective changing and focussing apparatus 10 according to the invention, which is fitted to a microscope 100 that has several objectives 12. The customary elements of the microscope 100 (such as device moving the stage, imaging sensor, etc.) are not shown in the figures for the purpose of easier comprehension. In the context of the present specification microscope 100 is preferably understood to mean a transmitted light scanning microscope, but optionally the microscope 100 may also be any other type of microscope, for example, even a confocal scanning microscope, which has a stage 14 and optical axis Z perpendicular to the stage 14. It should be noted that the optical axis Z is understood to mean the axis passing through the axis of symmetry (optical axis) of the objective 12 currently in use, which has been introduced in the interest of making it easier to understand the invention.

Figure 2:
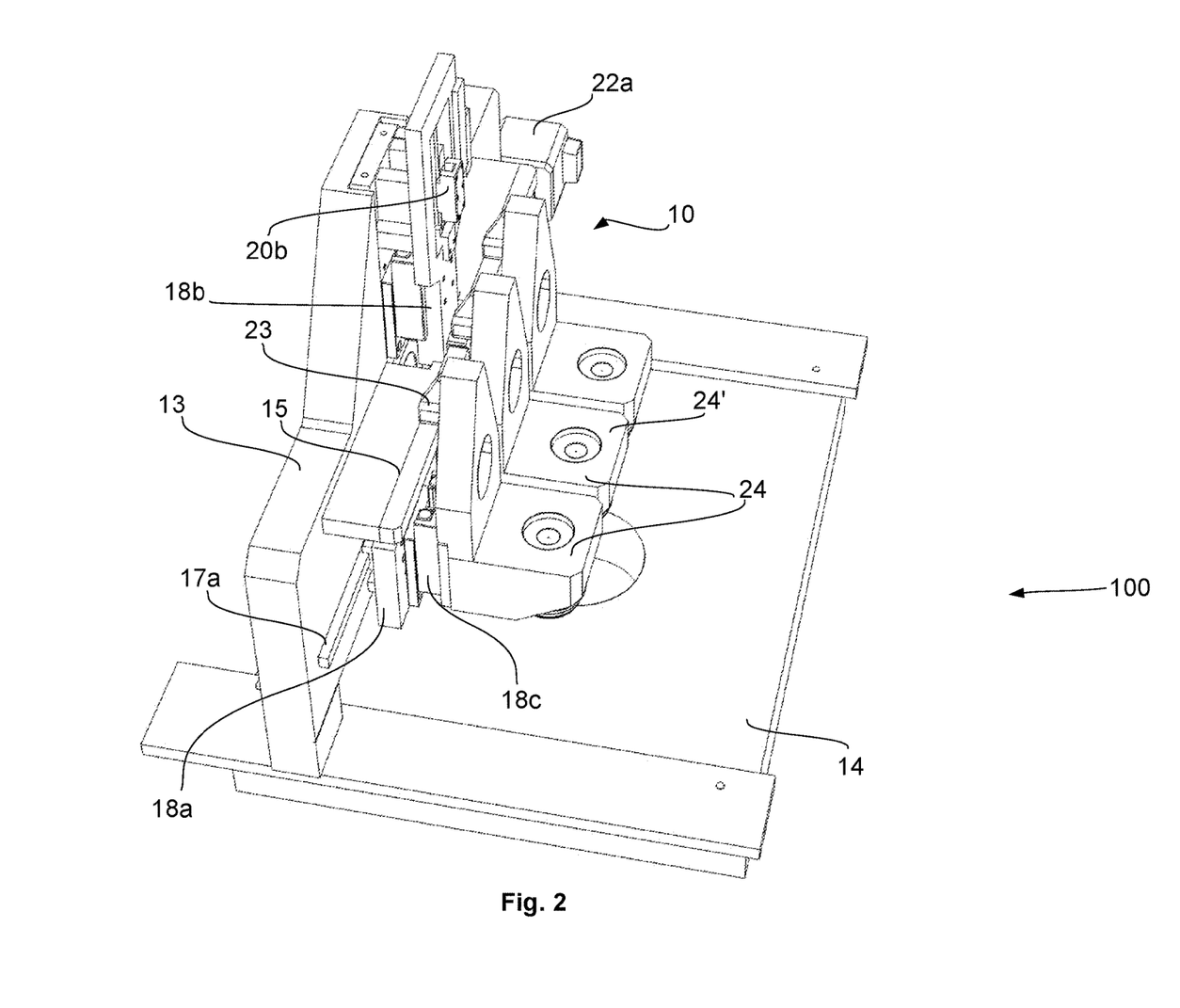

The apparatus 10 serves for changing and focussing the objectives 12, in other words for placing the objective 12 to be currently used from among the several objectives 12 into the optical axis Z and for moving it along the optical axis Z. The apparatus 10 contains a first rail system 16a arranged on the axis X perpendicular to the optical axis Z that has a first guide rail 17a fixed to the microscope 100 and a first moving member 18a guided by the first guide rail 17a, as well as a second rail system 16b arranged parallel to the optical axis Z that has a second guide rail 17b fixed to the microscope 100 that determines a starting position, and a second moving member 18b guided by the second guide rail 17b, as shown in FIG. 2b. Therefore the guide rail 17a is arranged parallel to the axis X and the guide rail 17b is arranged parallel to the axis Z. In the context of the present invention, movement along an axis is understood to mean any movement in directions parallel to the given axis, as is obvious to a person skilled in the art.

Figure 1B:
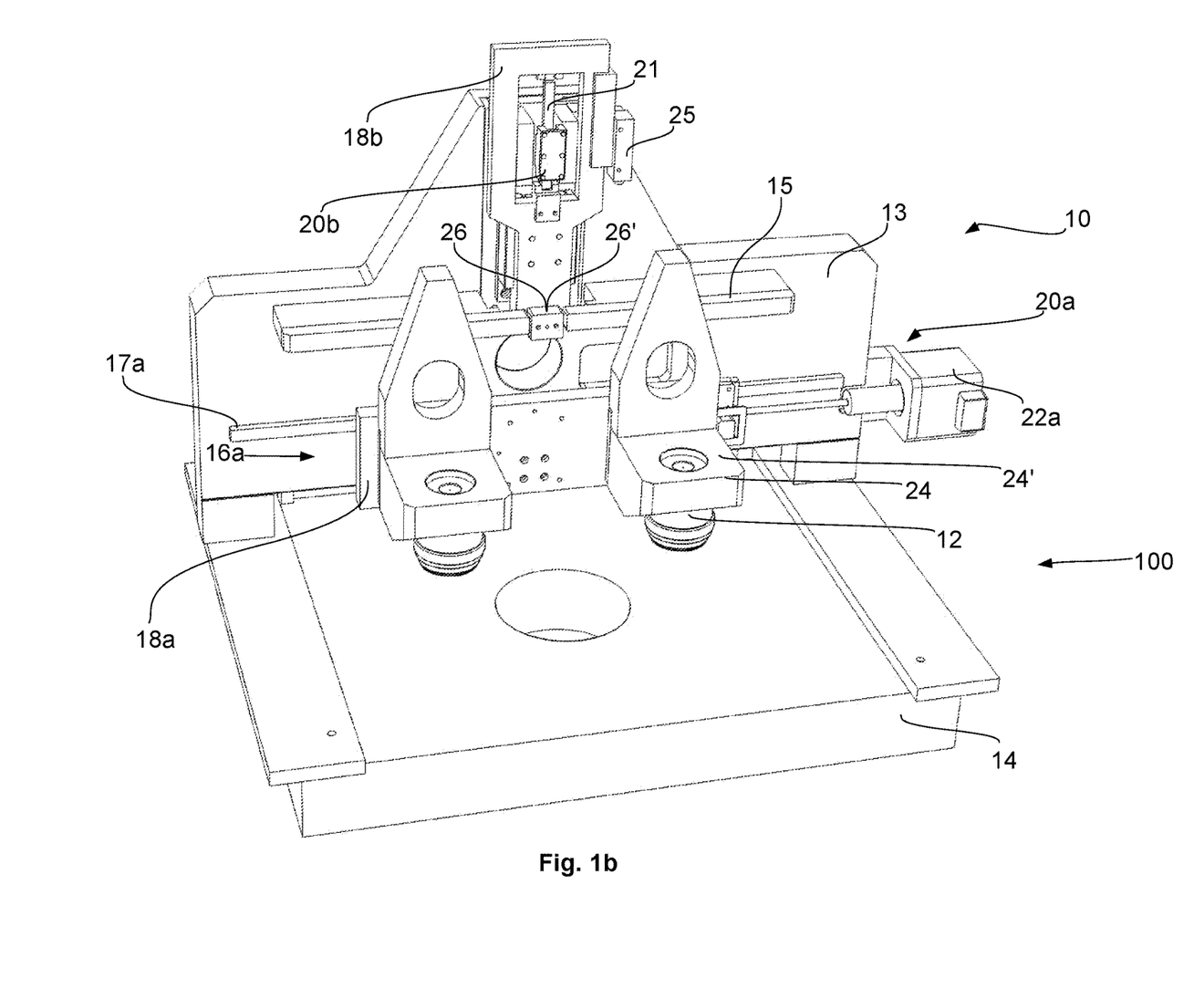
FIG. 1b depicts a schematic perspective view of the embodiment of the objective changing and focussing apparatus according to the invention presented in FIG. 1a without the objective interface element in starting position.
Figure 1C:
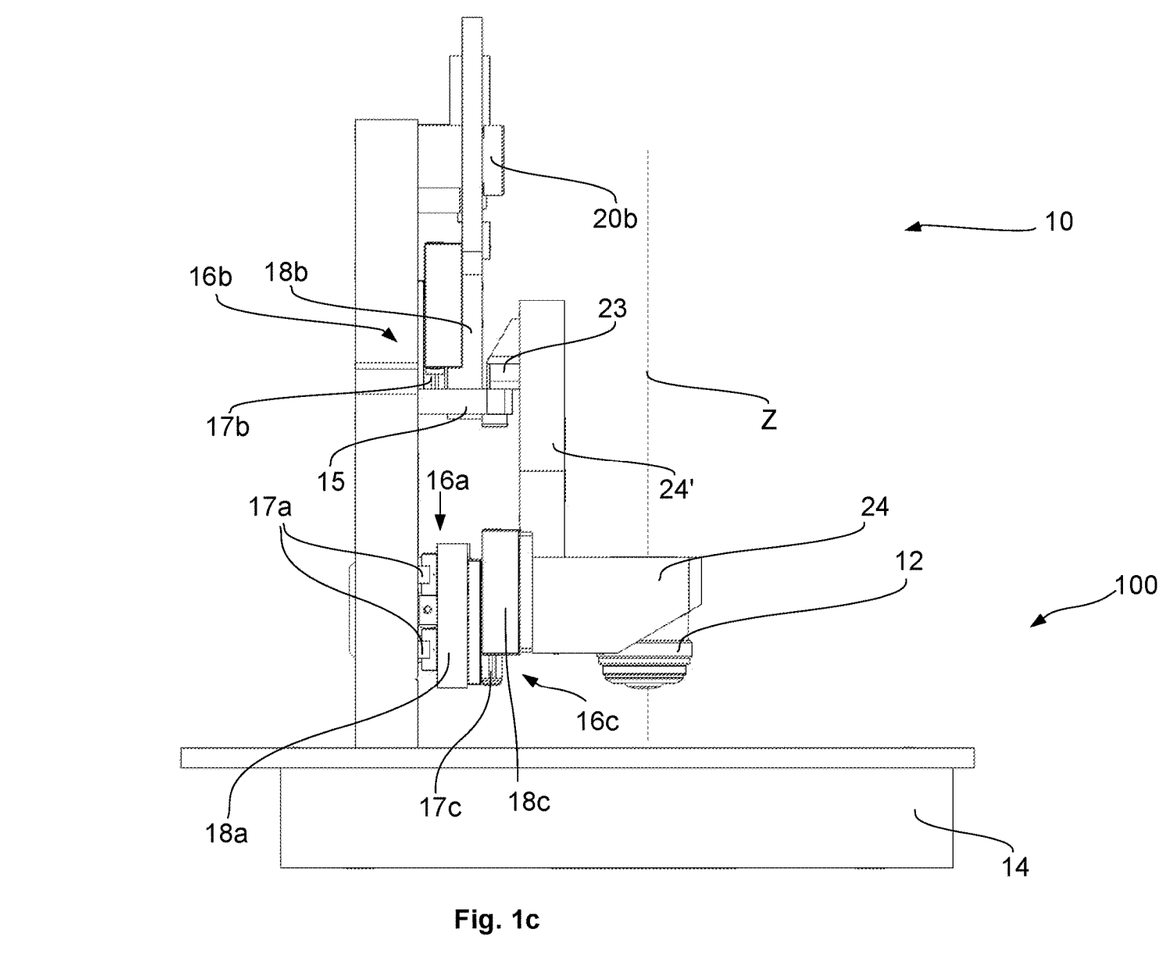
FIG. 1c depicts a schematic side view of the embodiment of the objective changing and focussing apparatus according to the invention presented in FIG. 1a, FIG. 2 is schematic perspective top view of the embodiment of the objective changing and focussing apparatus according to the invention presented in FIG. 1a, FIG. 3 is a schematic perspective view depicting a bottom view of the embodiment of the objective changing and focussing apparatus according to the invention shown in FIG. 1a without the other elements of the microscope.

It should be noted that in the case of the embodiment presented in FIGS. 1a to 1c, the rail system 16a contains two guide rails 17a, however, embodiments are conceivable in the cases of which the moving member 18a is guided by one, or optionally more than two guide rails 17a. Similarly, the rail system 16b may contain a single or more than two guide rails 17b. The guiderail 17a and the moving member 18a may be moved relative to one another along the X axis, and the guide rail 17b and the moving member 18b may be moved relative to one another along the Z axis. The guide rails 17a, 17b may be fixed to the microscope 100 in a releasable or non-releasable way, such as to the support plate 13 fixed to the base of the microscope 100, as is shown in FIGS. 1a to 1c. In this way the positions of the guide rails 17a, 17b relative to each other and to the microscope 100 are constant. The rail systems 16a, 16b may be, for example, slide tracks, roller tracks, rolling tracks, roller or ball rail systems. In the case of a preferred embodiment the rail systems 16a, 16b are provided as rail systems containing a linear, in other words straight guide rail 17a, 17b, preferably as cross roller rail systems 16a, 16b, as is known to a person skilled in the art.

The apparatus 10 according to the invention contains a first drive unit 20a in drive connection with the first rail system 16a serving to drive the first moving member 18a along the first guide rail 17a, in other words to push the moving member 18a along the X axis.

The first drive unit 20a is preferably fixed to the microscope 100, to the support plate 13 for example, and the first drive connection is ensured as a spindle drive. Naturally, optionally an embodiment is conceivable in the case of which the drive unit 20a is arranged apart from the microscope 100, such as on a base mechanically isolated from the microscope 100, and the first drive connection is provided in another way, with the help of a belt drive, for example.

In the case of a preferred embodiment the drive unit 20a contains a stepping motor 22a, which is preferably provided as an electric motor, such as a five-phase electric motor. By changing the polarity of the voltage connected to the stepping motor 22a the direction of rotation of the stepping motor 22a can be changed, in this way the moving member 18a can be moved in both directions along the axis X, and then fixed at a given position.

The apparatus 10 according to the invention contains several objective interface elements 24 that may be connected to the objectives 12, that are arranged next to one another along the axis X and that are fixed to the first moving member 18a in such a way that they may be moved along the axis Z.

Figure 3:
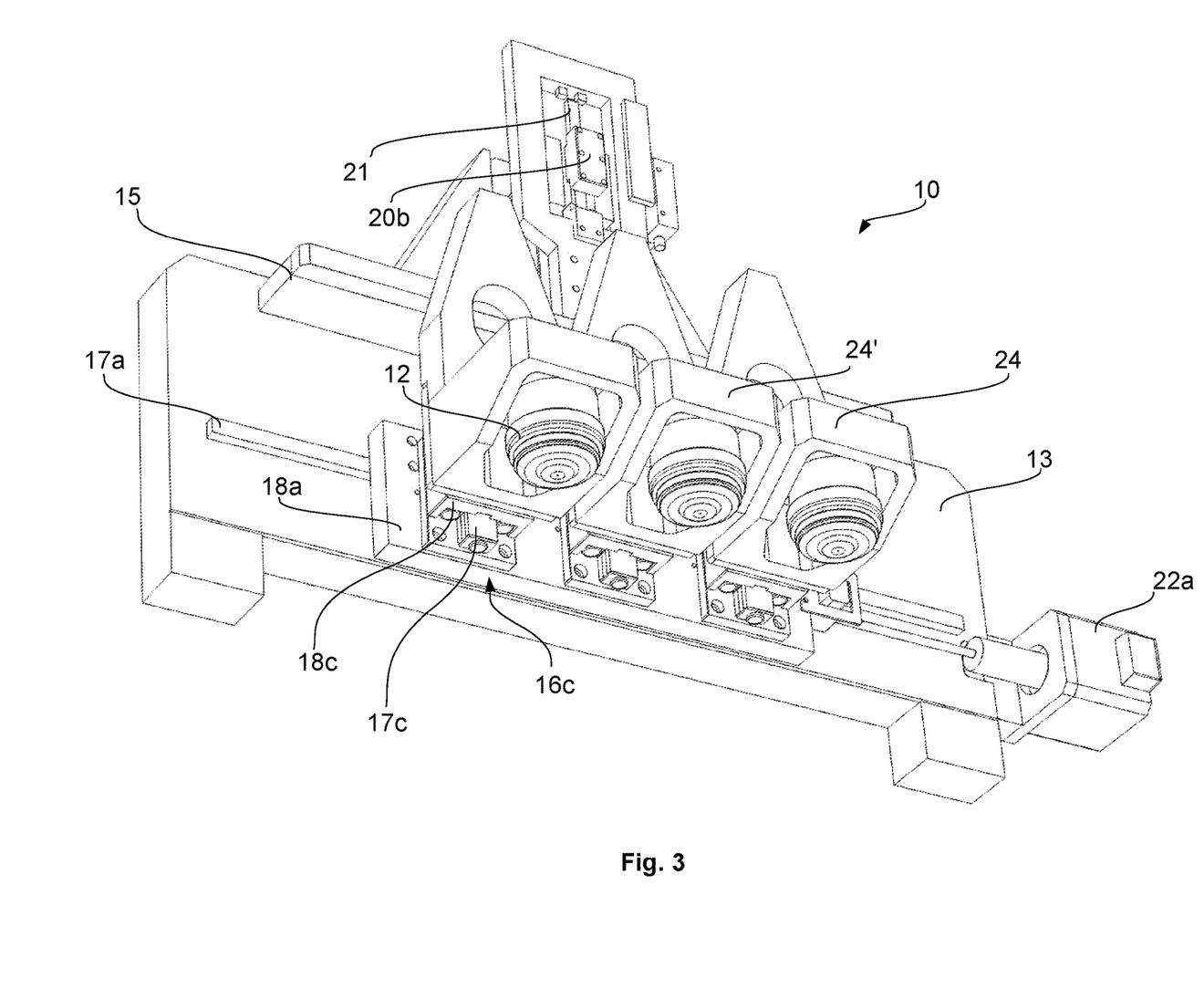

In the case of a particularly preferred embodiment the objective interface elements 24 are fixed to the first moving member 18a in such a way that they may be moved independently of one another along the optical axis Z. In other words, any of the objective interface elements 24 may be freely moved along the optical axis Z without this obstructing the other objective interface elements 24. Such fixing may be implemented in such a way, for example, that each of the objective interface elements 24 is fixed to the first moving member 18a with the help of an auxiliary rail system 16c containing an auxiliary moving member 18c fixed to the objective interface element 24 and an auxiliary guide rail 17c fixed to the first moving member 18a and that is suitable for guiding the auxiliary moving member 18c along the optical axis Z. The auxiliary moving member 18c and the auxiliary guide rail 17c are displayed clearly in FIG. 3. The auxiliary rail system 16c is preferably a rail system containing a linear guide rail 17c, such as a slide track, roller track, rolling track, roller or ball rail system, as is obvious for a person skilled in the art.

The objective interface elements 24 serve for securing the objectives 12. The objectives 12 are preferably connected to the objective interface elements 24 in a releasable way, such as with a screw connection, in such a way that a single objective 12 is connected to each objective interface element 24.

In the case of a particularly preferred embodiment each of the objective interface elements 24 is formed as an objective-holding socket 24' suitable for damping the mechanical vibrations occurring in the objective interface element 24 while it is being moved along the optical axis Z. In the context of the present invention vibration damping is understood to mean that the vibrations occurring as the result of the effect of external forces in the objective-holding socket 24' dissipate quickly after the termination of the external force effect, preferably in a maximum of 10 ms, even more preferably in a maximum of 5 ms. Such an objective-holding socket 24' suitable for damping vibrations can be established with the use of, for example, a hollow upper part and a supporting part perpendicular to this, as shown in FIG. 1a, for example.

The apparatus 10 contains a second drive unit 20b having a second drive connection with the second rail system 16b for moving the second moving member 18b along the second guide rail 17b, in other words for pushing the moving member 18b along the optical axis Z and securing it in a given position. In the case of a preferred embodiment the apparatus 10 contains a sensor 25, preferably an optical path meter, for determining the momentary position of the second moving member 18b relative to the second guide rail 17b. The sensor 25 provided as an optical path meter is a device suitable for creating a contactless, incremental or, preferably absolute measuring system operating on an optical principle. The sensor 25 provided as an optical path meter contains a scale supplied with several transparent and opaque divisions, and a reading head suitable for detecting and processing the information on the scale, such as a photoelectric sensor. Using the path meter sensor 25 the momentary position of the moving member 18b relative to the guide rail 17b, and therefore relative to the microscope 100, can be determined with a precision of a few tens of nanometres. Naturally, optionally the use of other types of path meter sensor 25 is conceivable (e.g. laser, magnetic, inductive, potentiometer, etc.), as is known to a person skilled in the art.

In the case of a particularly preferred embodiment, the second drive unit 20b contains a linear piezoelectric motor known of in itself. A linear piezoelectric motor is understood to mean a motor in the case of which piezoelectric crystals that change their size due to the effect of an electric field come into contact with a straight rod 21 and always push it in a single direction, due to which the vibration of the piezoelectric crystals is transformed into linear movement along the rod 21. In other words the piezoelectric motor and the driven rod 21 move with respect to each other. If the rod 21 (preferably one end of it) is fixed, then the piezoelectric motor moves along the fixed rod 21, therefore the object that needs to be moved needs to be connected to the motor. If the piezoelectric motor is fixed, then the object that needs to be moved needs to be connected to the rod 21. The advantage of the piezoelectric motor over the piezoelectric actuator that only makes use of the transformation of the shape of a piezoelectric crystal is that the stroke of the motor (the displacement of the rod 21) can be of any magnitude. The reason for this is that the shape change of the piezoelectric crystal occurring as a result of voltage is very small (approx. 0.1%), so the typical stroke of a piezoelectric actuator is a few hundreds of micrometres, up to a maximum of 1 to 2 mm, as is known by a person skilled in the art. The drive unit 20b may be arranged on the moving member 18b, in this case the rod driven by the piezoelectric motor is fixed to the microscope 100, for example to the support plate 13, in such a way that the axis of the straight rod is parallel to the optical axis Z and to the guide rail 17b.

In the case of the embodiment shown in FIG. 1a the piezoelectric motor of the drive unit 20b is fixed to the support plate 13 of the microscope 100, and the driven rod 21 is connected to the moving member 18b, parallel to the optical axis Z and the guide rail 17b.

Figure 4A:
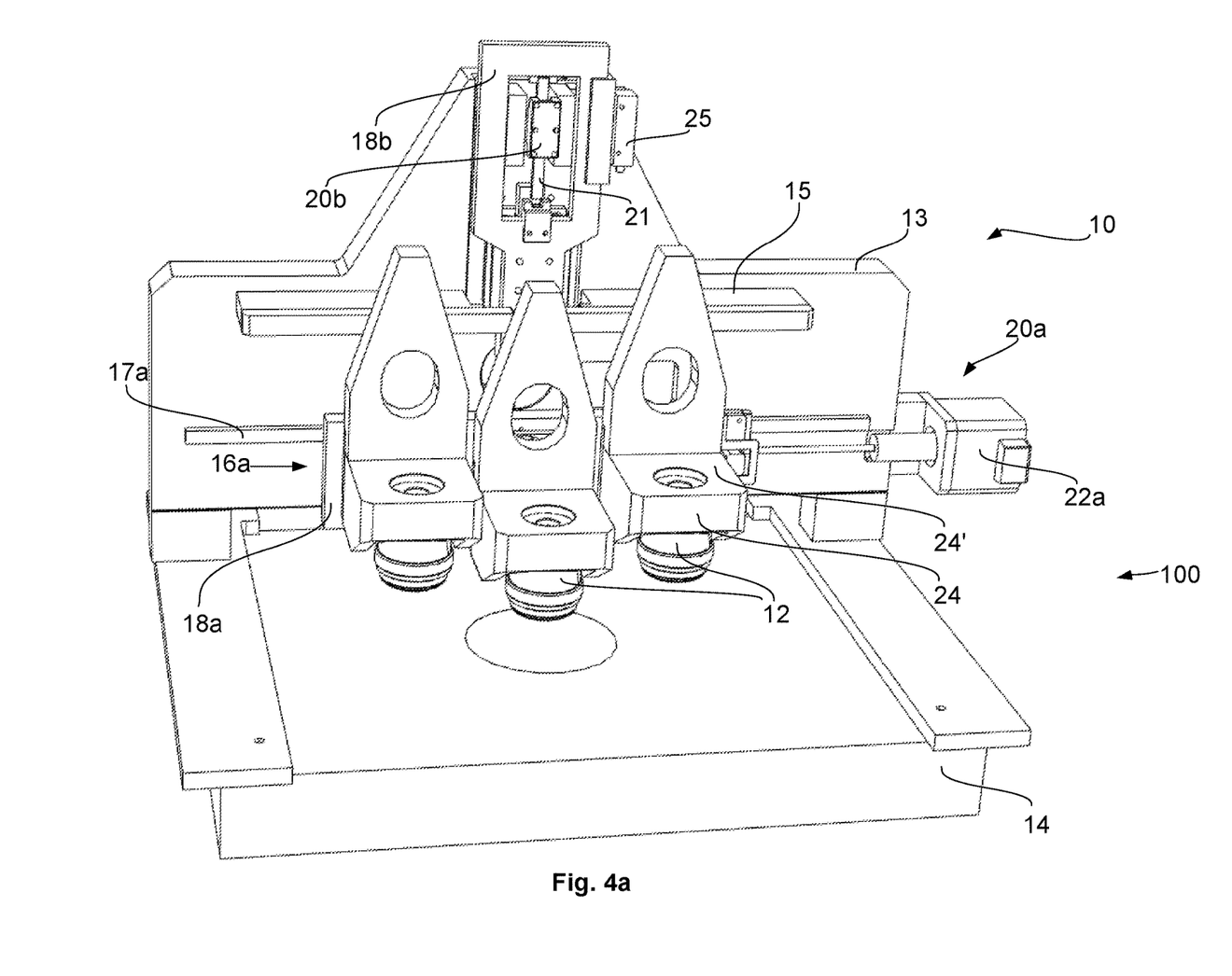
FIG. 4a depicts a view of the embodiment of the objective changing and focussing apparatus according to the invention presented in FIG. 1a while focussing.
Figure 4B:
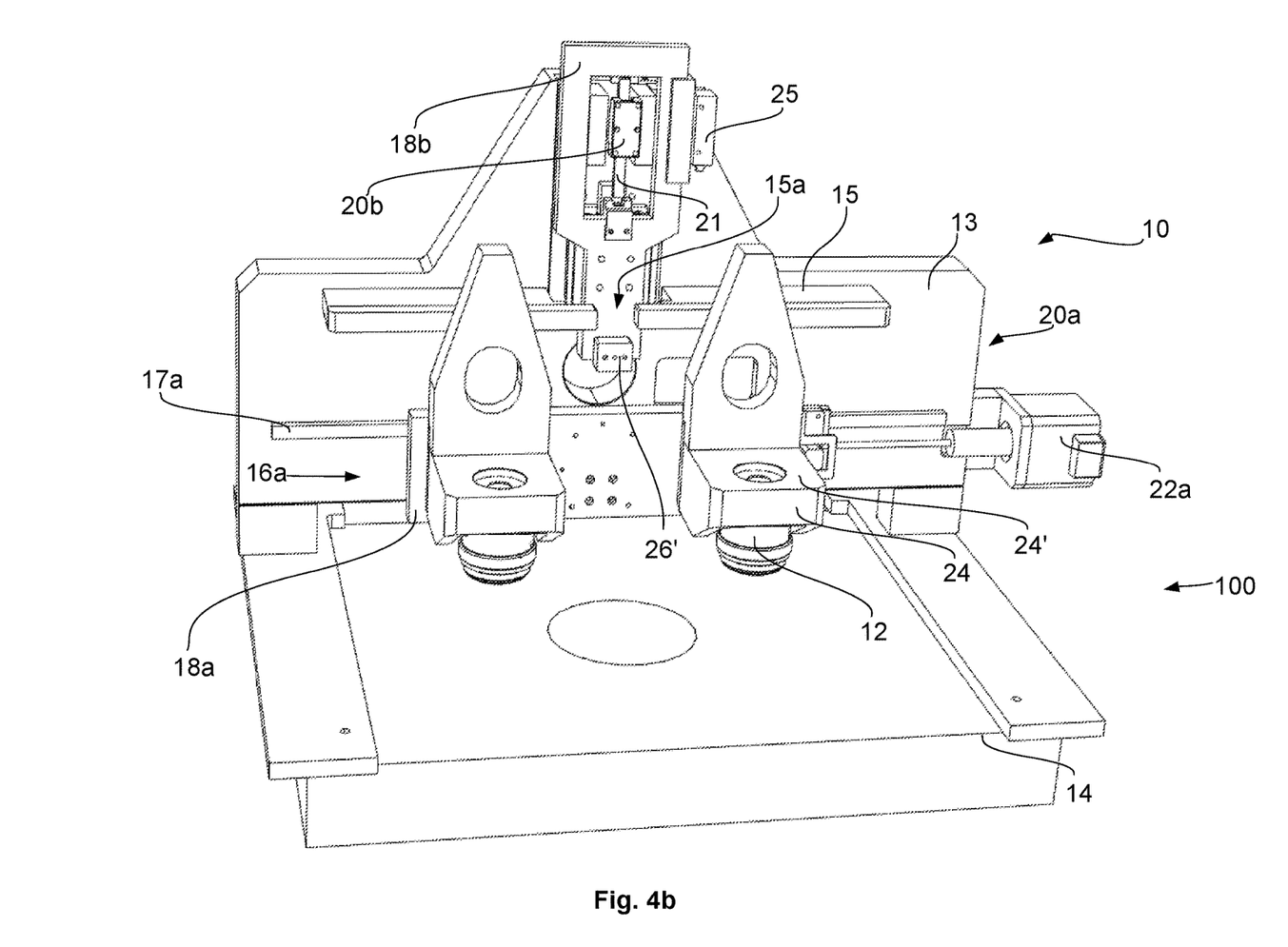
FIG. 4b depicts a schematic perspective view of the embodiment of the objective changing and focussing apparatus according to the invention presented in FIG. 4a without the objective interface element in starting position.

In the case of a preferred embodiment a support flange 15 serving for supporting the objective interface elements 24 is fixed to the support plate 13 parallel to the axis X. A gap 15a is provided in the support flange 15 at the starting position, as is shown in FIG. 4b. In the case of this embodiment the objective interface elements 24 are supplied with lifting pins 23 resting on the support flange 15 and that may be slid on it along the axis X. The lifting pins 23 are dimensioned so that when moved along the optical axis Z they fit through the gap 15a. The first moving member 18a may be moved into the desired position along the axis X with the help of the drive unit 20a, thereby any of the objective interface elements 24 fixed to the moving member 18a in a movable way may be placed in the starting position along the axis X determined by the second guide rail 17b.

The second moving member 18b contains a lifting element 26 serving for providing the releasable connection of the objective interface element 24 moved to the starting position to the second moving member 18b. In the context of the present invention starting position means the position of the objective interface element 24 along the axis X in which the objective interface element 24 located there can be releasably connected to the moving member 18b with the help of the lifting element 26.

In the case of the embodiment shown in FIG. 2 the releasable connection between the lifting element 26 and the objective interface element 24 located in the starting position is provided as a force locked joint, preferably as a weight force locked joint. The lifting element 26 is provided as a protrusion 26' fixed to the second moving member 18b protruding perpendicularly to the optical axis Z, which supports the objective interface element 24 moved to the starting position via the lifting pin of the objective interface element 24. The protrusion 26' is dimensioned so that it fits into the gap of the support flange 15 provided at the starting position (see FIG. 1b).

It should be noted that optionally other types of releasable connection between the moving member 18b and the objective interface element 24 in starting position are conceivable, such as a connection created by the help of an electromagnet, as is obvious for a person skilled in the art.

The object of the invention also relates to a microscope 100 that has several objectives 12 and a stage 14, and contains the objective changing and focussing apparatus 10 according to the invention. In the case of a preferred embodiment the microscope 100 is a transmitted light scanning microscope.

In the following the operation of the objective changing and focussing apparatus 10 and microscope 100 according to the invention will be presented.

The microscope 100 is preferably a high-speed transmitted light scanning microscope, with which a digital image of the sample to be examined can be produced. The microscope 100 has several objectives 12 with varying magnification and field of view. The objectives 12 of the microscope 100 are connected to objective interface elements 24 arranged one after the other along the axis X. The objective interface elements 24 are supported by the support flange 15 with the help of lifting pins 23 in such a way that the objective interface elements 24, or rather the objectives 12 connected to them, do not come into contact with the stage 14 of the microscope 100, therefore they may be moved along the axis X without restriction.

In the course of examining the sample a preview image is created using a low-magnification but wide-angle objective 12, in this way the areas to be examined can be precisely identified. In the interest of performing this operation the wide-angle objective 12 is placed in the light path determined by the optical axis Z in such a way that the objective interface element 24 containing the objective 12 to be used is moved into the starting position by operating the drive unit 20a and by suitably displacing the moving member 18a along the axis X. In the case of a preferred embodiment the control and operation of the drive unit 20a takes place automatically, for example, on the basis of the data of the optical path meter sensors (not shown) presented above, with the help of a computer, as is obvious for a person skilled in the art.

Simultaneously with, or in advance of, moving the objective interface element 24 into starting position the moving member 18b containing the lifting element 26 is taken into a position suitable for receiving the objective interface element 24 to be used with the help of the drive unit 20a. In the cases of embodiments containing the protrusion 26' and lifting pin 23, this means that the protrusion 26' is moved to the same plane as the support flange 15 before the objective interface element 24 is taken to the starting position (see FIG. 1b), in this way when taken to the starting position the lifting pin 23 of the objective interface element 24 slips on to the protrusion 26'. In this state the objective interface element 24 moved to starting position is not supported by the support flange 15, but by the protrusion 26' instead.

Figure 4C:
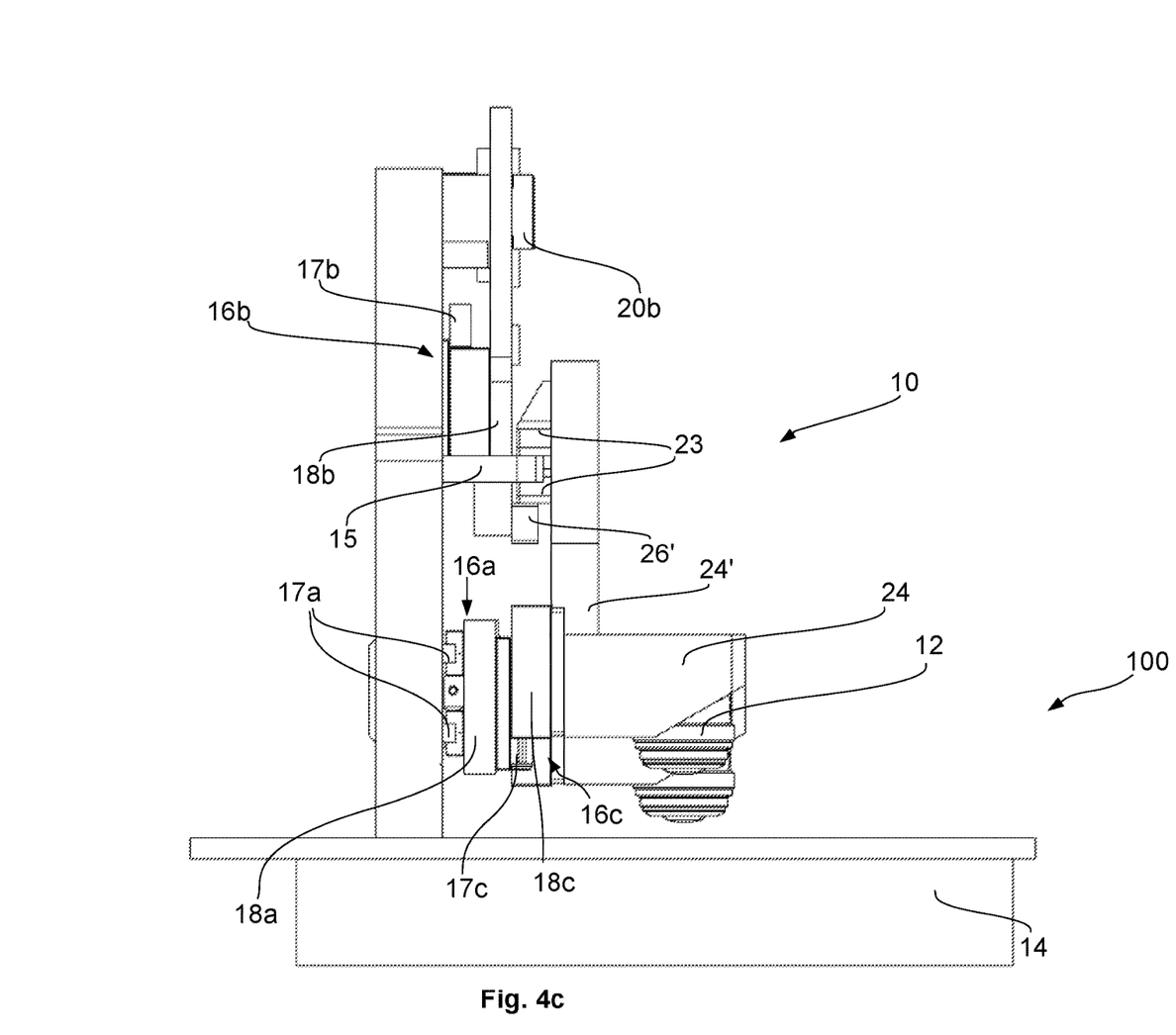

With the operation of the drive unit 20b the moving member 18b is moved downwards (in other words towards the stage 14), or, optionally, upwards, the protrusion 26' supports the lifting pin 23 from below and as a result the objective interface element 24 and the connected objective 12 may be moved into the desired position through the displacement of the moving member 18b along the optical axis Z. In the case of a particularly preferred embodiment the drive unit 20b contains a linear piezoelectric motor. The advantage of the piezoelectric motor is that the stroke, in other words the range of movement of the moving member 18b along the optical axis Z is not limited, additionally the position of the moving member 18b along the optical axis Z can be quickly and precisely changed (with a precision of as much as a few tens of nanometres). Therefore, by using a piezoelectric motor the lowering (of a few centimetres) of the objective 12 into the use position shown in FIGS. 4a and 4c and precise (within just a few tens of nanometres) focussing of the objective 12 can be implemented at the same time. In the case of a preferred embodiment the control of the drive unit 20b and the adjustment of the focus of the objective 12 take place automatically, using the data of the optical path meter sensor 25 presented above, with the help of a computer (not shown), as is obvious for a person skilled in the art.

A greater magnification objective 12 needs to be used for the detailed examination of the sample. After the preview image has been produced the lower magnification objective 12 is taken out of the optical path determined by the optical axis Z with the help of the apparatus 10, and a greater magnification objective 12 is positioned in its place. In the interest of this the objective interface element 24 containing the lower magnification objective 12 currently being used is taken to the same level as the other objective interface elements 24 by moving the moving member 18b upwards, in other words the gap of the support flange 15 is filled with the protrusion 26'. Following this the drive unit 20a is brought into operation, the lifting pin 23 is slipped off the protrusion 26' by moving the moving member 18b along the axis X, and pushed over the support flange 15, through this the releasable connection between the objective interface element 24 and the moving member 18b is terminated. Following this the objective interface element 24 connected to the greater magnification objective 12 that is to be used is taken into the starting position in the way presented above.

In the case high resolution is required the entire sample will not fit inside the field of view of the objective of the microscope 100, therefore the digital image has to be assembled from several image recordings. In the course of this the rectangular slide (not shown) of the microscope 100 is scanned in columns next to one another and parallel to the longer sides of the slide in such a way that the sample is moved in the plane of the stage 14 in the direction parallel to the longer sides of the slide. The scanning of a given column may be continuous or intermittent. After a given column has been scanned, the slide is displaced in the direction perpendicular to the scanning direction, and then the neighbouring column is scanned as described above. The scanning of the columns parallel to one another is continued until the production of the digital image of the entire sample is completed.

By displacing the sample, the distance between the surface of the sample and the objective 12 changes. Therefore, in order to obtain a sharp image, the focus of the objective 12 must be continuously adjusted while the sample is being moved. As the moving of the sample takes place quickly, the focus of the objective 12, in other words the position of the objective 12 on the optical axis Z must be changed quickly (every few milliseconds). Mechanical vibrations are caused in the course of the movement of the objective interface element 24 along the optical axis Z, especially when the movement of the objective interface element 24 is started and stopped. The amplitude of these vibrations is characteristically in the micrometre or smaller range, but as the field of focus of the objectives 12 is only a few tenths of a micrometre, these vibrations, when transmitted to the objective 12, cause a significant deterioration of the imaging quality. In the interest of overcoming the negative effect of the vibrations, the objective interface element 24 is preferably formed as a vibration-damping objective-holding socket 24', which is suitable for damping (dissipating) the mechanical energy of the vibrations in a few milliseconds.

Various modifications to the above disclosed embodiments will be apparent to a person skilled in the art without departing from the scope of protection determined by the attached claims.

The invention claimed is:

1. Objective changing and focusing apparatus (10) for microscopes (100) containing a plurality of objectives (12), and having an optical axis Z, characterised by that it contains
   a first rail system (16a) having a first guide rail (17a) fixed to the microscope (100) and a first moving member (18a) guided by the first guide rail (17a), wherein the first rail system (16a) is arranged along an axis X perpendicular to the optical axis Z,
   a first drive unit (20a) in drive connection with the first rail system (16a),
   a plurality of objective interface elements (24), adapted for being connected to the objectives (12), arranged next to one another along the X axis and fixed to the first moving member (18a) movably along the Z axis,
   a second rail system (16b) having a second guide rail (17b) fixed to the microscope (100) and a second moving member (18b) guided by the second guide rail (17b), wherein the second rail system (16b) is arranged parallel to the optical axis Z, and defines a starting position along the X axis, and
   a second drive unit (20b) having a second drive connection with the second rail system (16b), and the second moving member (18b) is provided with a lifting element (26) providing a releasable connection with an objective interface element (24) located in the starting position.

2. Objective changing and focusing apparatus (10) according to claim 1, characterised by that the objective interface elements (24) are fixed to the first moving member (18a) such as to be separately movable relative to each other along the optical axis Z.

3. Objective changing and focusing apparatus (10) according to claim 1, characterised by that the second drive unit (20b) contains a linear piezoelectric motor.

4. Objective changing and focusing apparatus (10) according to claim 1, characterised by that each of the objective interface elements (24) is formed as an objective-holding socket (24') adapted for damping the mechanical vibrations occurring in the objective interface element (24) while it is being moved along the optical axis Z.

5. Objective changing and focusing apparatus (10) according to claim 1, characterised by that each of the objective interface elements (24) is fixed to the first moving member (18a) with an auxiliary rail system (16c) having an auxiliary moving member (18c) fixed to the objective interface element (24) and an auxiliary guide rail (17c) adapted for guiding the auxiliary moving member (18c) along the optical axis Z and fixed to the first moving member (18a).

6. Objective changing and focusing apparatus (10) according to claim 1, characterised by that the first drive unit (20a) is an electric stepping motor arranged on the microscope (100), preferably a five-phase electric motor, and the first drive connection is provided with a spindle drive.

7. Objective changing and focusing apparatus (10) according to claim 1, characterised by that it contains a sensor (25), preferably an optical path meter, for determining the momentary position of the first moving member (18a) relative to the first guide rail (17a) and/or the momentary position of the second moving member (18b) relative to the second guide rail (17b).

8. Objective changing and focusing apparatus (10) according to claim 1, characterised by that the first and second rail systems (16a, 16b) are formed as straight rail systems, preferably cross roller rail systems.

9. Objective changing and focussing apparatus (10) according to claim 1, characterised by that the releasable connection between the lifting element (26) and the objective interface element (24) located in the starting position is provided as a force locked joint, preferably as a weight force locked joint.

10. Microscope (100) having a plurality of objectives (12), comprising an objective changing and focussing apparatus (10) according to claim 1.

* * * * *